(12) United States Patent
Kudo et al.

(10) Patent No.: US 7,625,673 B2
(45) Date of Patent: Dec. 1, 2009

(54) ELECTRODE MATERIAL FOR ELECTROCHEMICAL ELEMENT AND METHOD FOR PRODUCTION THEREOF, AND ELECTROCHEMICAL ELEMENT

(75) Inventors: Tetsuichi Kudo, Tokyo (JP); Masaru Miyayama, Tokyo (JP); Keiji Sakai, Tokyo (JP); Yasuo Takeda, Tsu (JP); Itaru Honma, Tsukuba (JP); Hiroshi Abe, Ibaraki (JP)

(73) Assignees: Hitachi Maxell, Ltd., Osaka (JP); Japan as Represented by the President of the University of Tokyo, Tokyo (JP)

( * ) Notice: Subject to any disclaimer, the term of this patent is extended or adjusted under 35 U.S.C. 154(b) by 388 days.

(21) Appl. No.: 10/129,362

(22) PCT Filed: Sep. 6, 2001

(86) PCT No.: PCT/JP01/07719

§ 371 (c)(1),
(2), (4) Date: May 3, 2002

(87) PCT Pub. No.: WO02/21617

PCT Pub. Date: Mar. 14, 2002

(65) Prior Publication Data

US 2002/0172869 A1    Nov. 21, 2002

(30) Foreign Application Priority Data

Sep. 6, 2000    (JP)    ............................. 2000-269531

(51) Int. Cl.
*H01M 4/62*    (2006.01)
(52) U.S. Cl. ................................. 429/231.8; 429/218.1

(58) Field of Classification Search ................ 29/623.5;
427/126.3, 126.4, 126.5, 126.6; 429/218.1,
429/209, 218.2, 126.3, 126.4, 126.5, 126.6,
429/231.8, 231.95, 232; 420/900; 252/182.1
See application file for complete search history.

(56) References Cited

U.S. PATENT DOCUMENTS 5,518,836 A    5/1996    McCullough (Continued)

FOREIGN PATENT DOCUMENTS

EP    0664570 A1    7/1995

(Continued)

OTHER PUBLICATIONS

Baddour et al., J. Electroanal. Chem. vol. 277, pp. 359-366, (1990).

(Continued)

*Primary Examiner*—Patrick Ryan
*Assistant Examiner*—Monique Wills
(74) *Attorney, Agent, or Firm*—Birch, Stewart, Kolasch & Birch, LLP

(57) ABSTRACT

An electrode material for an electrochemical device comprising a composite of a particulate conductive material and a metal oxide is prepared by mixing and dispersing the particulate conductive material with a colloidal solution of an oxide of an element in a range of from Group 3 to Group 12 in the fourth, fifth and sixth periods of the Periodic Table and heating the mixture. This composite has a high capacity even at a high current density and good filling properties, and is useful as an electrode material for an electrochemical device such as a lithium secondary battery or an electrochemical capacitor. When the electrode material comprising this composite is used, an electrode can be produced without any binder, and the electrochemical device having good output characteristics can be constructed.

10 Claims, 2 Drawing Sheets

U.S. PATENT DOCUMENTS

| | | | |
|---|---|---|---|
| 6,040,087 A | 3/2000 | Kawakami | |
| 6,063,142 A * | 5/2000 | Kawakami et al. | 29/623.5 |
| 6,255,018 B1 | 7/2001 | Ise et al. | |
| 6,329,101 B1 * | 12/2001 | Kawakami | 429/218.2 |
| 6,458,487 B1 | 10/2002 | Takeuchi et al. | |
| 6,465,127 B1 * | 10/2002 | Shin | 429/218.1 |

FOREIGN PATENT DOCUMENTS

| | | | |
|---|---|---|---|
| EP | 0715366 A1 | | 6/1996 |
| EP | 0809314 A2 | | 11/1997 |
| EP | 0936690 A2 | | 8/1999 |
| JP | 10-255785 A | | 9/1998 |
| JP | 10255785 A | * | 9/1998 |
| JP | 10-275631 A | | 10/1998 |
| JP | 2000-36303 | | 2/2000 |
| JP | 2001-102048 | * | 4/2001 |
| WO | WO-99/05734 A1 | | 2/1999 |

OTHER PUBLICATIONS

Zheng et al., Electrochemical and Solid-State Letters, vol. 2, No. 8, pp. 359-361, (1999).

* cited by examiner

ELECTRODE MATERIAL FOR ELECTROCHEMICAL ELEMENT AND METHOD FOR PRODUCTION THEREOF, AND ELECTROCHEMICAL ELEMENT

This application is the national phase under 35 U.S.C. § 371 of PCT International Application No. PCT/JP01/07719 which has an International filing date of Sep. 6, 2001, which designated the United States of America.

FIELD OF THE INVENTION

The present invention relates to an electrode material for an electrochemical device, a method for producing the same and an electrochemical device comprising the same. In particular, the present invention relates to an electrode material comprising a composite of a particulate conductive material and a metal oxide, a method for producing such an electrode material, and an electrochemical device comprising such an electrode material such as a lithium secondary battery, an electrochemical capacitor, etc.

BACKGROUND ART

An electrode, in particular, a positive electrode of a lithium secondary battery is produced by a method comprising mixing a positive electrode active material which comprises a metal oxide such as $LiCoO_2$ and a powder of a conductive material such as carbon with an organic solvent solution or an aqueous dispersion of a binder to obtain a paste containing the positive electrode mixture, applying the paste containing the positive electrode mixture on an electrode collector such as a metal foil, and drying the paste to form a thin film of the positive electrode mixture on the collector.

A lithium secondary battery comprising a positive electrode produced by the above method has a high energy density, but it cannot effectively cope with charging and discharging at a high current density (under a high load) and thus it cannot have a high capacity since the positive electrode active material is inherently an insulating material. Furthermore, a binder is always necessary to retain the active material and maintain the shape of the positive electrode. Therefore, the binder, which is also an insulating material, interferes with the conductivity of the electrode, and thus the performance of the battery further deteriorates at the high current density.

Also, investigations are made on electrochemical capacitors using the oxidation-reduction reactions of lithium, and the increase of the output from the capacitor is attempted by decreasing the particle size of the active material or increasing the amount of an electrically conductive material. However, when the particle size of the active material is decreased, the volume of the material increases while a bulk density decreases. In addition, the conductive material is also bulky. Accordingly, the filling property of an electrode deteriorates and thus a high energy density cannot be attained. Furthermore, if the filling rate is low, gaps are formed between the active material and the conductive material and the contact between them is not always good so that sufficient conductivity is not achieved.

DISCLOSURE OF THE INVENTION

One object of the present invention is to provide an electrode material for an electrochemical device, which can solve the problems of the conventional electrode materials for the electrochemical devices, has a high capacity even at a high current density and a good filling property, and suitable for use in an electrochemical device such as a lithium secondary battery, an electrochemical capacitor, etc., and also an electrochemical device comprising such an electrode material.

The present inventors have made various studies to achieve the above object, and found that, when conductive material particles are added to and dispersed in a colloidal solution of an oxide of a metal element in a range of from Group 3 to Group 12 in the fourth, fifth and sixth periods of the Periodic Table and then the mixture is heated, an electrode material is obtained, which comprises the composite of the conductive material particles and the oxide of the metal element, and has a high capacity even at a high current density and a high bulk density so that it has a good filling property. Accordingly, the present invention has been completed.

According to the first aspect of the present invention, there is provided an electrode material for an electrochemical device comprising a composite of a metal oxide and a particulate conductive material which is obtainable by heating a mixture of a colloidal solution of an oxide of an element in a range of from Group 3 to Group 12 in the fourth, fifth and sixth periods of the Periodic Table, and a particulate conductive material.

According to the second aspect of the present invention, there is provided an electrode material for an electrochemical device comprising a composite of a particulate conductive material and an oxide of an element in a range of from Group 3 to Group 12 in the fourth, fifth and sixth periods of the Periodic Table, wherein a coating film of said oxide of said metal element having a thickness of 0.5 to 10 nm is formed on the surface of said particulate conductive material.

The electrode material for the electrochemical device according to the present invention has a higher bulk density and a better filling property and thus can be more highly filled than an electrode material which is prepared by simply dry mixing the metal oxide and the conductive material. Furthermore, since the metal oxide covers the surfaces of the particles of the conductive material, the contact between the conductive material and the metal oxide increases. Thus, the electrode material of the present invention can provide an electrochemical device having a high capacity even at a high current density.

EMBODIMENTS FOR WORKING THE INVENTION

Figure 1:
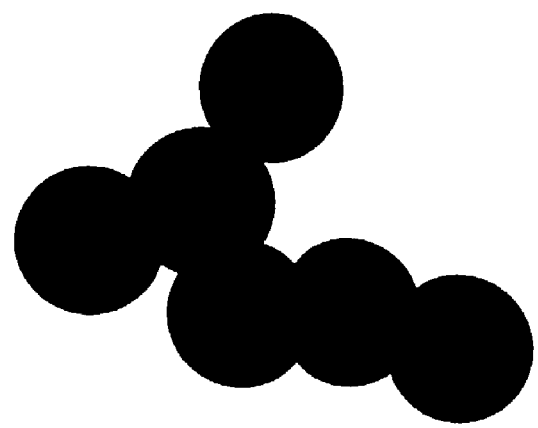
FIG. 1 schematically shows one example of the shape of the electrode material of the present invention.

In the present invention, the metal oxide used to produce the electrode material is an oxide of an element in a range of from Group 3 to Group 12 in the fourth, fifth and sixth periods of the Periodic Table. Specific examples of the oxides of the metal elements belonging to Group 3 to Group 12 in the fourth, fifth and sixth periods of the Periodic Table are oxides of Sc, Ti, V, Cr, Mn, Fe, Co, Ni, Cu, Zn, Y, Zr, Nb, Mo, Tc, Ru, Pd, Ag, Cd, lanthanoids, Hf, Ta, W, Re, Os, Ir, Pt, Au, Hg, etc. Among them, the oxides of the metal elements belonging to Group 5 to Group 10 in the fourth period of the Periodic Table such as V, Cr, Mn, Fe, Co and Ni, and a composite oxide comprising such a metal element and at least one other metal element are particularly preferable.

The oxide of the metal element may contain an element other than the above elements, for example, Si, Sn, Al, an alkali metal element or an alkaline earth metal element such as Li, Mg, etc.

As the particulate conductive material, carbonaceous materials such as acetylene black, carbon black, activated carbon, carbon fibers, carbon nanotubes, etc. and powder of metals such as aluminum, titanium, nickel, etc. can be used. The particulate conductive material may comprise primary particles or secondary particles, or chains of particles like acetylene black.

The weight ratio of the metal oxide to the conductive material is preferably from 70:30 to 10:90, particularly preferably from 50:50 to 25:75.

The above oxide of the metal element is firstly processed in the form of a colloidal solution and then mixed with the conductive material.

In general, it is difficult to prepare a colloidal solution directly from the metal oxide. Therefore, preferably, the colloidal solution of the metal oxide is prepared by mixing a metal powder with a liquid containing an oxidizing agent such as hydrogen peroxide, or by mixing an acetate salt, a nitrate salt, a carbonate salt, etc. of the metal with a liquid containing an oxidizing agent.

The colloidal solution of the oxide of the metal element and the particulate conductive material are mixed and dispersed by any mixing means such as a stirrer, a ball mill, or ultrasonic dispersing, and the like. The mixing temperature and time are not limited. Preferably, the mixture is mixed and dispersed at a temperature of 0 to 40° C. for about 1 to 12 hours.

After mixing and dispersing, the dispersion as prepared may be heated, or it may be heated after separating the mixture of the metal oxide and the conductive material from the dispersion to some extent by filtration, centrifugation, etc.

The heating conditions are not limited. Preferably, the temperature is at least 50° C., more preferably at least 80° C., and does not exceed preferably 450° C., more preferably 300° C. The heating time is preferably at least 1 hour, more preferably at least 3 hours, and is not longer than preferably 24 hours, more preferably 10 hours. Particularly, in the case where the carbonaceous material is used as the particulate conductive material, when the heating temperature exceeds 450° C., the carbonaceous material may be oxidized and decomposed. Therefore, it is preferable to carry out the heating treatment at a lower temperature than in the case using the metal powder, more preferably, a temperature of 300° C. or lower.

When the electrode material comprising the composite of the metal oxide and the conductive material, which is prepared thorough the above heating treatment, is observed with a transmission electron microscope, a black contour is observed on the surface of the conductive material particle. It is confirmed with an energy-dispersion type X-ray microanalyzer that the black contour comprises the metal oxide. That is, it is confirmed that the electrode material of the present invention comprises the particle of the conductive material on the surface of which a covering layer of the metal oxide is formed.

The thickness of the covering layer of the metal oxide is preferably from 0.5 to 10 nm. When the thickness of the covering layer is 0.5 nm or more, the electrode material has the sufficient capacity. When the thickness of the covering layer is 10 nm or less, the conductivity increases and thus the sufficient output is achieved.

In the present invention, the electrode material is expressed "a composite material of a particulate conductive material and an oxide of a metal element in a range of from Group 3 to Group 12 in the fourth, fifth and sixth periods of the Periodic Table". This expression does not mean that the electrode material consists of the metal oxide and the conductive material only. Rather, a part of the metal oxide or the conductive material may be changed to other material by heating, or the composite may contain other material in an amount which does not adversely affect the properties of the electrode material. It is expected that safety, cycling properties, etc. may be improved by the selection of a suitable additive or additives.

The electrode material, which is prepared by the above method, has decreased bulkiness in comparison with the mixed powder prepared by simply mixing the metal oxide and the conductive material. When this bulkiness is expressed in terms of a bulk density, the electrode material of the present invention has a high bulk density and a good filling property as an electrode material. The bulk density is a density of a powder including spaces among the powder particles when the powder is filled in a container, and can be calculated by dividing the weight of the powder filled in a specific volume with the specific volume. The higher bulk density means the smaller bulkiness of the powder and indicates the better filling property. A preferable range of the bulk density depends on the kinds of the metal oxide and the conductive material, and it is difficult to determine a commonly preferable range. According to the present invention, the bulk density of the electrode material can be increased to about 15 to 60% of the true density of the material.

An electrode can be produced using the electrode material of the present invention as follows:

To the electrode material, a binder such as polytetrafluoroethylene or polyvinylidene fluoride is added and mixed, and the electrode mixture is shaped with a suitable means. For example, the electrode mixture is press molded. Alternatively, the electrode mixture is dispersed in a solvent to prepare a paste containing the electrode mixture (where the binder may be beforehand dissolved in a solvent and then mixed with the electrode material), the paste containing the electrode mixture is applied on an electrode collector made of a metal foil or a metal mesh and dried to form a thin film of the electrode mixture on the collector.

The methods for the production of the electrode are not limited to the above methods, and other method may be employed. For example, the collector is dipped in or coated with the dispersion of the colloidal solution of the metal oxide and the conductive electrode to apply the dispersion to the collector, and then heated. In this case, a suitable amount of an aqueous dispersion of the binder such as polytetrafluoroethylene may be added to the dispersion of the colloidal solution of the metal oxide and the conductive material. However, the electrode may be produced without a binder, since the electrode material of the present invention has a sufficient binding strength with the collector. Accordingly, the electrode material of the present invention can provide the electrochemical device having excellent output properties.

The electrode material of the present invention can be used as the electrode material of the electrochemical device such as the lithium secondary battery, electrochemical capacitor, etc., since it has a function to dope and dedope lithium ions. Furthermore, the electrode material of the present invention may find an application in an electrochemical device comprising an aqueous electrolyte solution. Since the electrode material of the present invention has a high capacity even at a high current density, it is particularly suitable as the electrode material of the lithium secondary battery or an alkali battery, which is a power source used in a field requiring a high output, for example, an electric automobile, an electric bicycle, etc., or the electrochemical capacitor.

The electrode material of the present invention has a high bulk density and a better filling property than the conventional electrode material comprising the mixed powder of the metal oxide and the conductive material, and can be processed to form an electrode even in the absence of a binder. The electrode material of the present invention can provide the electrochemical device having a high capacity even at a high current density.

EXAMPLES

The present invention will be explained in detail with the following examples, which do not limit the present invention in any way.

Example 1

Metal vanadium (1 g) and 30 wt. % aqueous hydrogen peroxide (100 ml) were mixed and stirred in an ice bath for 3 hours. Then the mixture was kept standing for 24 hours to obtain a colloidal solution in which vanadium pentoxide ($V_2O_5$) was present in the form of a sol.

Acetylene black (0.1 g), water (2 g) and acetone (1 g) were added to the resulting colloidal solution of vanadium pentoxide (5 g), and mixed and dispersed with a stirrer for 3 hours. Then, the mixture was heated at 120° C. for 3 hours to obtain a composite of vanadium pentoxide and acetylene black. The weight ratio of the vanadium pentoxide to acetylene black in the composite was 7:10, and the true density of the composite was 2.4 g/cm$^3$.

Figure 2:
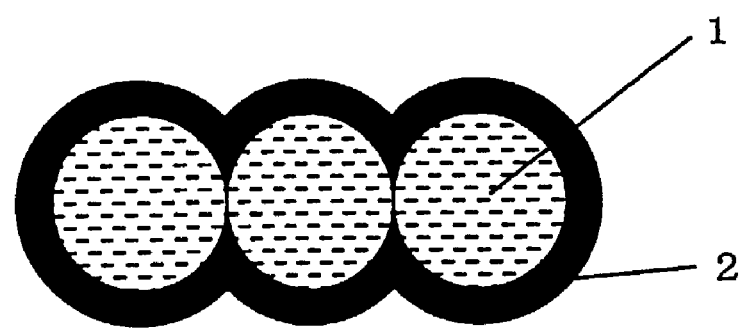
FIG. 2 schematically shows one example of the cross section of the electrode material of the present invention.

The composite (5 g) was filled in a graduated cylinder and vibrated until no volume change was observed, and then a bulk density was measured. The bulk density of the composite was 0.50 g/cm$^3$, which was 21% of the true density. When the composite was observed with a transmission electron microscope and analyzed with an energy-dispersion type X-ray microanalyzer, it was confirmed that the coating layer 2 of vanadium pentoxide having a thickness of about 5 nm was present all over the surface of the carbon particle 2. FIG. 1 schematically shows the shape of the composite of Example 1, while FIG. 2 schematically shows the cross section of the composite of Example 1.

Then, to the composite (0.2 g), polytetrafluoroethylene powder was added as a binder, and the resulting electrode mixture was press molded together with a collector made of an aluminum mesh to press adhere the electrode mixture to the collector. Thereby, an electrode was obtained. The composition of the electrode mixture of this electrode contained vanadium pentoxide, acetylene black and polytetrafluoroethylene in a weight ratio of 38:58:4.

The electrode was stamped in the form of a disk having a diameter of 15 mm and used as a positive electrode, while a disk-form lithium having a diameter of 17 mm was used as a negative electrode, and propylene carbonate containing 1 mol/l of LiCl$_4$ dissolved therein was used as an electrolyte to assemble a coin-form lithium secondary battery having a diameter of 20 mm and a height of 1.6 mm.

Example 2

Acetylene black (0.1 g), water (2 g) and acetone (1 g) were added to the colloidal solution (3.8 g) of vanadium pentoxide which was prepared in the same manner as in Example 1, and the mixture was stirred and dispersed with a stirrer for 3 hours and further dispersed with an ultrasonic homogenizer for 5 minutes to obtain a dispersion. The dispersion was applied on an aluminum foil and heated at 120° C. for 3 hours to obtain an electrode comprising the aluminum foil and the film of the composite of vanadium pentoxide and acetylene black formed on the foil. The weight ratio of vanadium pentoxide to acetylene black in the composite film was 1:2.

After that, a coin-form lithium secondary battery was assembled in the same way as in Example 1.

Comparative Example

A colloidal solution of vanadium pentoxide, which was prepared in the same manner as in Example 1, was heated at 120° C. for 3 hours to obtain vanadium pentoxide fine powder.

The vanadium pentoxide fine powder and acetylene black were mixed in a weight ratio of 7:10, and the bulk density of the resulting mixed powder was measured. The bulk density was 0.046 g/cm$^3$. That is, when the vanadium pentoxide fine powder and acetylene black were mixed in the same weight ratio as that of the composite of Example 1, the bulk density of the mixture was less than one tenth ($\frac{1}{10}$) of that of the composite of Example 1, and thus the mixture had the low filling property.

Then, the vanadium pentoxide fine powder, acetylene black and polytetrafluoroethylene were mixed to prepare an electrode mixture containing the vanadium pentoxide, acetylene black and polytetrafluoroethylene in a weight ratio of 38:58:4. Using this electrode mixture, the production of an electrode in the same manner as in Example 1 was tried, but no electrode could be produced since the binding property of the particles was low. Therefore, an electrode was produced with increasing the amount of polytetrafluoroethylene so that the weight ratio of the vanadium pentoxide, acetylene black and polytetrafluoroethylene was 33:50:17. After that, a coin-form lithium secondary battery was assembled in the same way as in Example 1.

Figure 3:
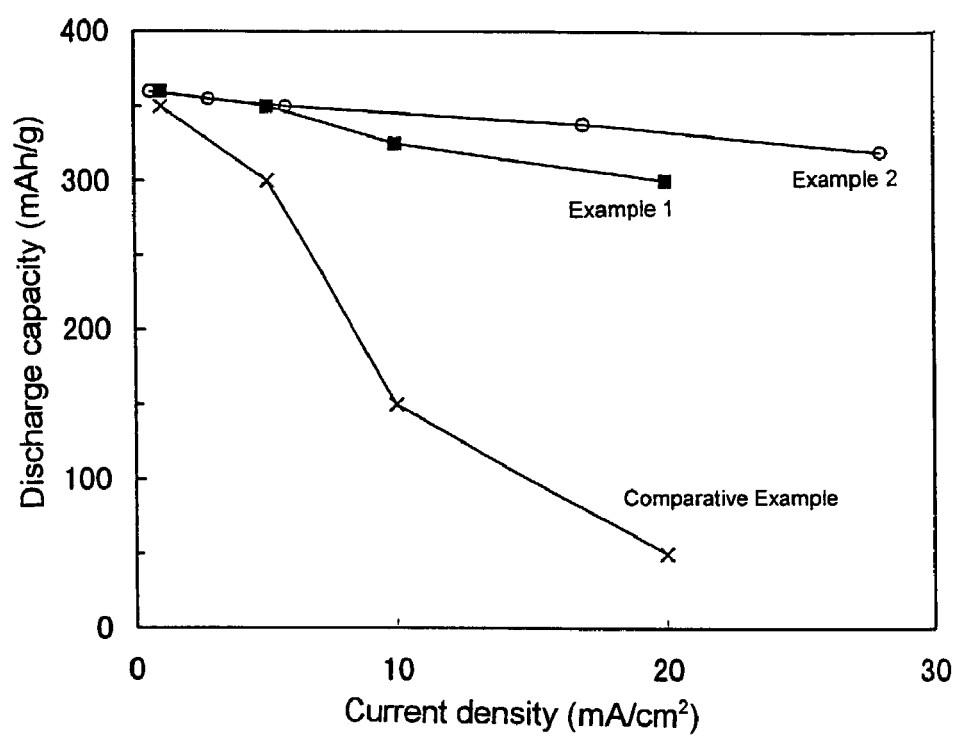
FIG. 3 shows the output characteristics of the lithium secondary batteries of Examples 1-2 and Comparative Example.

Each of the lithium secondary batteries of Examples 1 and 2 and Comparative Example was subjected to a charge-discharge test (Charge cut voltage: 4.2 V, discharge cut voltage: 2.0 V) at various current densities, and a discharge capacity was measured to evaluate the output property. The results are shown in FIG. 3. Here, the current density in FIG. 3 is expressed in terms of a current value per unit area of the positive electrode, and the discharge capacity is expressed in terms of a discharge capacity per unit weight of vanadium pentoxide.

As can be seen from the results in FIG. 3, the discharge capacity of the battery of Comparative Example greatly decreased as the current density increased, while the discharge capacity of the batteries of Examples 1 and 2 scarcely decreased as the current density increased. In particular, the battery of Example 2 containing no binder had the extremely good output property.

The invention claimed is:

1. An electrode for a lithium secondary battery comprising a positive electrode composite of a metal oxide having a function to dope and dedope lithium ions and a particulate carbonaceous material which is obtained by heating a mixture of a colloidal solution of an oxide of a metal element selected from the group consisting of Ti, V, Cr, Mn, Fe, Co, Ni, Cu, Zr, Nb, Mo and W, and a particulate carbonaceous material, wherein the surface of said particulate carbonaceous material is covered with an electrode active material containing said metal oxide, and wherein said electrode functions as a positive electrode.

2. An electrode for a lithium secondary battery comprising a positive electrode composite of a particulate carbonaceous material and an oxide of a metal element selected from the group consisting of Ti, V, Cr, Mn, Fe, Co, Ni, Cu, Zr, Nb, Mo and W, wherein a coating film of an electrode active material containing said oxide of said metal element and having a function to dope and dedope lithium ions and a thickness of 0.5 to 10 nm is formed on the surface of said particulate carbonaceous material, and wherein said electrode functions as a positive electrode.

3. A method for producing an electrode material for an electrochemical device comprising the steps of:
   mixing and dispersing a particulate carbonaceous material with a colloidal solution comprising an oxide of an element selected from the group consisting of Ti, V, Cr, Mn, Fe, Co, Ni, Cu, Zr, Nb, Mo and W, and
   heating the mixture to form a positive electrode composite of said particulate carbonaceous material and said oxide of the element in which the surface of said particulate carbonaceous material is covered with an electrode active material containing said oxide of the element.

4. An electrochemical device having an electrode for a lithium secondary battery according to claim 1 or 2.

5. An electrode for a lithium secondary battery comprising a composite according to claim 1 or 2, wherein said composite comprises a core consisting essentially of said carbonaceous material, and said metal oxide covering said core.

6. An electrode for a lithium secondary battery according to claim 1 or 2, wherein said metal oxide is a composite oxide comprising an element selected from the group consisting of Ti, V, Cr, Mn, Fe, Co, Ni, Cu, Zr, Nb, Mo and W, and at least one metal element other than elements from Group 3 to Group 12 in the fourth, fifth and sixth periods of the Periodic Table.

7. An electrode according to claim 1, wherein said carbonaceous material is selected from the group consisting of acetylene black and carbon black.

8. An electrode according to claim 1 or 7, wherein a weight ratio of said metal oxide to said particulate carbonaceous material is from 70:30 to 1:2.

9. An electrode according to claim 2, wherein said carbonaceous material is selected from the group consisting of acetylene black and carbon black.

10. An electrode according to claim 2 or 9, wherein a weight ratio of said metal oxide to said particulate carbonaceous material is from 70:30 to 1:2.

* * * * *